United States Patent Office 3,432,916
Patented Mar. 18, 1969

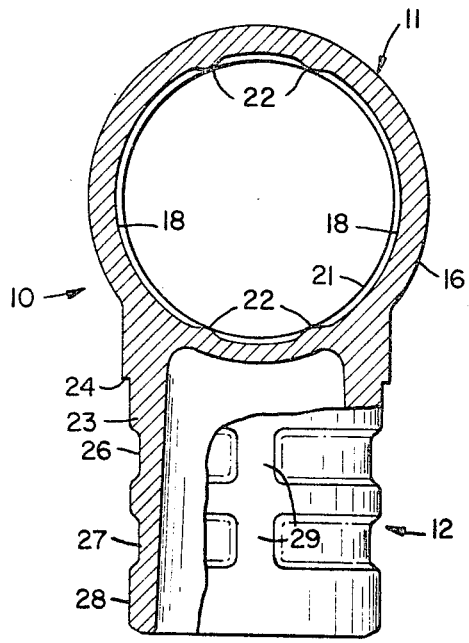
FIG_1
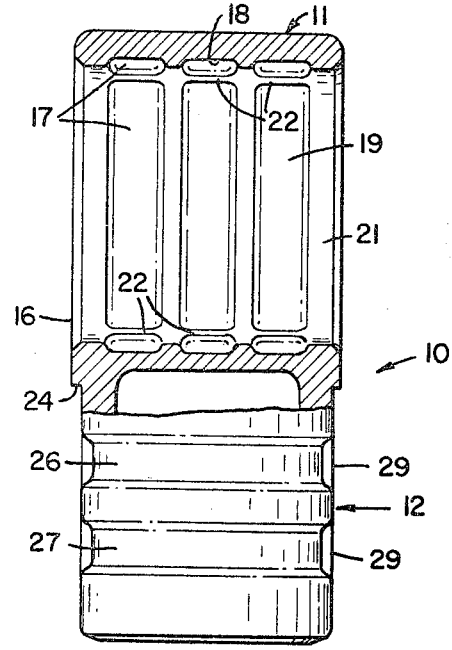
FIG_2
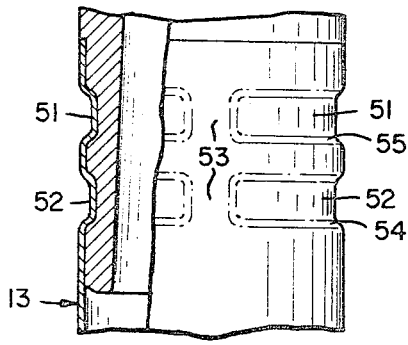
FIG_4
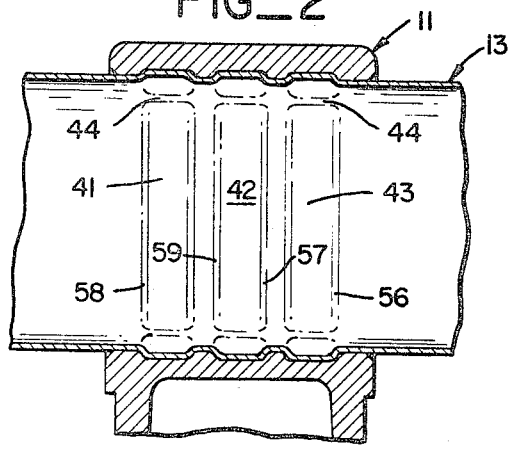
FIG_3
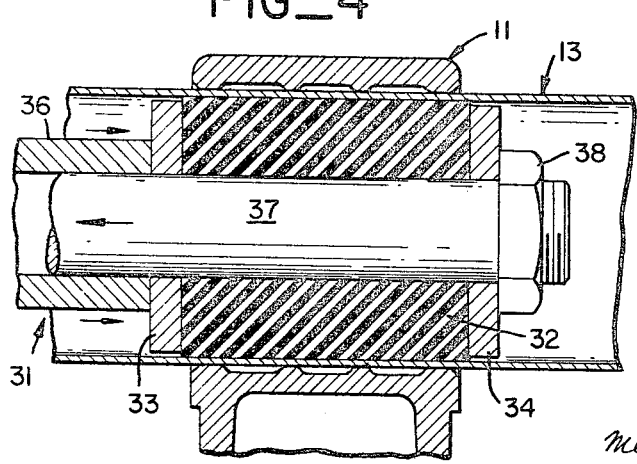
FIG_5

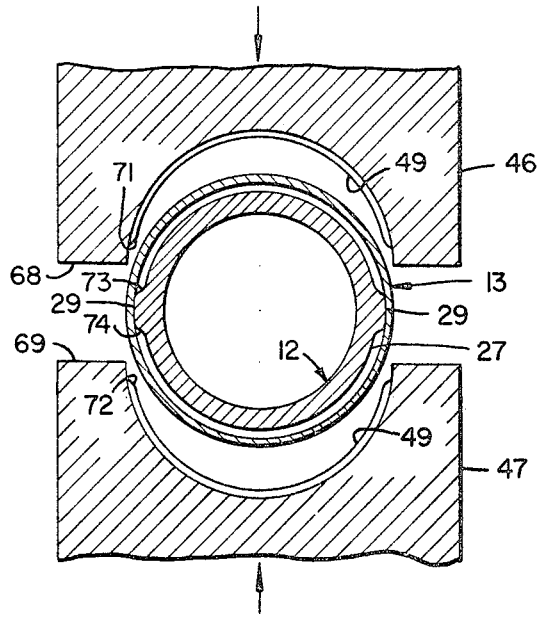
FIG_6
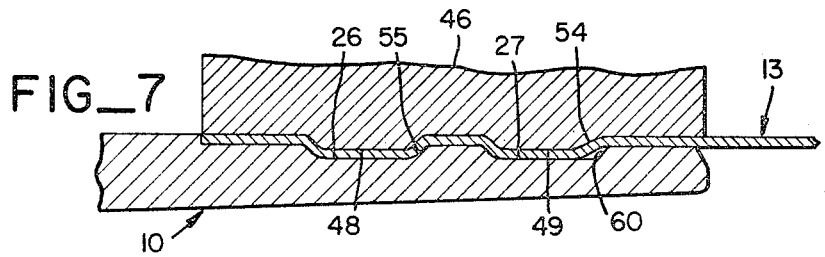
FIG_7
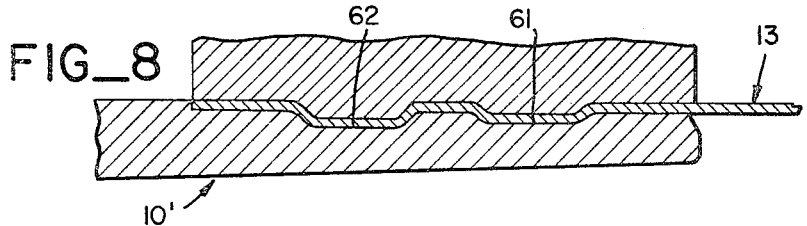
FIG_8
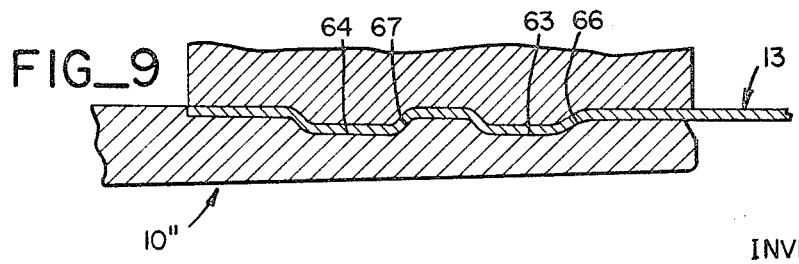
FIG_9

3,432,916
METHOD FOR MAKING A JOINT FOR HARDENED ALUMINUM TUBING
Robert E. Fisher, Berkeley, Rijkent W. Kofman, and Ernest D. Reichert, Lafayette, and Reinold H. Visser, Albany, Calif., assignors to Up-Right, Inc., Berkeley, Calif., a corporation of California
Filed Apr. 18, 1966, Ser. No. 543,396
U.S. Cl. 29—516
Int. Cl. F16l *19/00*
4 Claims

ABSTRACT OF THE DISCLOSURE

A method for making a joint between an annular coupling member and a hardened aluminum tubing extending from one end of the coupling member, in which two axially spaced grooves are formed in the coupling member and in which the tubing member is permanently deformed into the grooves in such manner that the tubing member is deformed into the groove adjacent said end of the coupling member at a longitudinal curvature greater than the deformation of said tubing member into the other groove. The joint is also formed so that a hoop stress is produced in the completed joint.

---

This invention relates to the method of making strong rigid joints between hardened aluminum tubing and coupling members.

Thin-walled aluminum tubing made of hardened aluminum alloys, such as cold-worked aluminum, has come into extensive use in the making of lightweight scaffolding. Typically such tubing has relatively low ductility, in the order of 10–15% elongation in a 2-inch-long test specimen before failure when subjected to tension tests.

In the construction of scaffolding it is necessary to make many joint connections between the various tubing members of the scaffold, and the labor expense in the formation of the many joints forms a substantial portion of the production cost of the assembled scaffold. Prior to the present invention such joints have been made by welding or by adhesive bonding, either of which methods is relatively slow and requires workmen having a relatively high degree of skill, with attendant high pay scales.

The present invention was developed to provide a method of making aluminum tubing joints which could be made much more quickly by relatively inexperienced workmen and which could produce joints having a strength in excess of the strength of the tubing so that when an axial load on the tubing is imposed the tubing will fail at some point other than at the joint.

Attempts have been made to make tubing joints that have a final appearance somewhat resembling the joint of the present invention, but the heretofore known techniques have not been successfully applied to metals having such a low ductility as the hardened aluminum tubing for which the present invention was developed.

A principal object of the present invention is to provide a joint for low-ductility aluminum tubing in which the axial load carried by the joint is as strong as the tubing.

Another object is to provide torsional resistance in such a joint.

Other objects and advantages will become apparent in the course of the following detailed description.

In the drawings which form a part of this application, and in which preferred embodiments of the invention are shown, FIG. 1 is a view, partly in section, of a coupling member constructed in accordance with the invention and having a first internally grooved portion adapted to couple to a tubing member telescopically inserted therein and a second externally grooved portion adapted to couple to a tubing member telescoped thereonto;

FIG. 2 is a view, partly in section, of the coupling member of FIG. 1, rotated through 90°;

FIG. 3 is a section view of the internally grooved portion of the coupling member of FIG. 1 with a tubing member joined thereinto;

FIG. 4 is a view, partly in section of the externally grooved portion of the coupling member of FIG. 1 with a tubing member joined thereonto;

FIG. 5 is a sectional view illustrating the manner in which the joint of FIG. 3 is made;

FIG. 6 is a sectional view illustrating the manner in which the joint of FIG. 4 is made;

FIGS. 7, 8 and 9 are sectional views illustrating different ways in which the tubing may be deformed into the grooves of the coupling member in accordance with the invention.

Referring now to the drawings, FIGS. 1 and 2 illustrate a coupling member 10 having first and second parts 11 and 12 that are designed to make a T-joint between tubings 13. As mentioned previously, the coupling member is designed particularly for use with hardened aluminum tubing 13 that has a low degree of ductility. A specific example of a tubing which has been used successfully in practice of the present invention is a 2-inch O.D. cold-worked aluminum alloy tubing, identified in the trade as Alcoa 6063–T8E16 and having a wall thickness of .058 inch. Such tubing has an elongation of between 10–15% in a standard 2-inch gauge section before failure when subjected to a standard tension test.

The first part of the coupling member 10 comprises an annular member 16 having three circumferential grooves 17, 18 and 19 formed in the inner wall 21 thereof, which grooves are interrupted by longitudinal ribs 22 so that the grooves do not extend completely around the inner wall of the coupling member.

The second part 12 of the coupling member also comprises an annular shank 23 having a shoulder 24 and circumferential grooves 26 and 27 formed in the outer wall 28 thereof, which grooves are interrupted by diametrically spaced longitudinal ribs 29.

FIG. 5 illustrates one manner in which the joint of FIG. 3 is made, i.e., a joint wherein the coupling member 10 is joined to the exterior of a tubing member 13. The tubing is exerted into the annular member 16 of the coupling and the coupling is positioned at the desired point along the tubing. A tubing expander 31 is then inserted from one end into the tubing and positioned adjacent the coupling member. The illustrated tubing expander 31 comprises an elastomer sleeve 32 confined between two steel washers 33 and 34, a tubing 36 bearing against washer 33 and a rod 37 extending through the tubing 36, washer 33, sleeve 32 and washer 34. A nut 38 is threaded to rod 37 and bears against washer 34. The tubing 36 and rod 37 extend beyond the end of tubing 13 and are connected to a hydraulically operated piston (not shown) which can exert forces on the tubing 36 and rod 37 to move them in the directions indicated by the arrows in FIG. 5. Such movement will compress sleeve 32 between the washers, thereby applying an outward radial pressure on the tubing 13 to deform it at 41, 42 and 43 into the coupling grooves 17, 18 and 19. The pressure on the sleeve 32 is then relieved and the tubing expander 31 removed from the joint, leaving a joint as shown in FIG. 3. As will be noted, the deformations 41, 42 and 43 of the tubing 13 do not extend completely around the circumference of the tubing, e.g., at 44, due to presence of the ribs 22 in the coupling member grooves.

FIGS. 6 and 7 illustrate the manner in which the joint of FIG. 4 is made, i.e., a joint wherein the coupling member 10 is joined to the interior of a tubing member 13.

The tubing 13 is telescoped onto the shank 23 of the coupling member so that the end of the tubing abuts the coupling member shoulder 24. Die members 46 and 47 are positioned on opposite sides of the assembled coupling and tubing, these die members being provided with circumferential ribs 48 and 49 which register with the coupling member grooves 26 and 27, so that when the die members are forced together in a direction as indicated by the arrows in FIG. 6, the die member ribs will exert a radial pressure on the tubing to deform the tubing at 51 and 52 into the coupling member grooves, producing a joint as illustrated in FIG. 4. Again, the deformations 51 and 52 do not extend completely around the circumference of tubing 13, e.g., at 53, because of the presence of the longitudinal ribs 29.

It has been found that the depth of the grooves in the coupling member is an important factor because of the low ductility of the tubing 13, and should not exceed more than about one and one-half times the tubing wall thickness. If the groove depth exceeds this amount the tubing will fail in the formation of the joints due to the stresses produced as the low-ductility material is deformed.

In order that a strong and rigid joint be formed, it is necessary that the coupling member be properly related in its elastic properties to those of the tubing. An important aspect of the present invention is that, in forming a joint, the radial force on the tubing will be of a magnitude sufficient to cause permanent deformation of the tubing into the coupling member grooves, and will also cause a circumferential stress and strain (expansion in the case of the joint of FIG. 3 or compression in the case of the joint of FIG. 4) in the tubing. This radial force will also be exerted on the coupling member, causing it to be subjected to a circumferential stress and a resultant strain so that it will expand (FIG. 3) or contract (FIG. 4), depending upon whether the radial force is directed towards or away from the axis of the coupling member. The coupling member must be designed so that after the radial force is removed, it will tend to spring back to its original shape more than will the tubing member. If so designed, the final joint will then have a hoop stress, as in a shrink fit joint, which will secure the members rigidly together. That is, for a FIG. 3 joint, after the radial force is removed the tubing will spring back towards its original position, but cannot return there because the force imposed upon it has been sufficient to cause a permanent deformation. At the same time, the coupling member will spring back towards its original position because the circumferential stress therein has been relieved. However, the coupling member is prevented from returning to the full degree that it could because of the presence of the tubing member, and the coupling member will thus retain some of its circumferential stress and strain and will impose a circumferentially compressive stress on the tubing member.

The reverse would be true in a FIG. 4 joint, in that after the joint formation pressure has been relieved, the inner coupling member will seek to expand back to its original position but will be prevented from returning as far as it could because of the presence of the tubing. The coupling member will then impose a circumferentially expansive stress in the tubing member.

Thus, in either a FIG. 3 or FIG. 4 joint the outer member of the joint will be under a circumferentially expansive stress and the inner member of the joint will be under a circumferentially compressive stress, thereby providing a tight rigid joint.

As is apparent, the coupling member must be designed relative to the tubing member so that the force imposed on the joint will be sufficient to cause permanent deformation of the tubing member without causing permanent deformation of the coupling member. Or, the coupling and tubing members must be related so that the permanent strain produced by the circumferential stresses applied will be less for the coupling than for the tubing member.

To accomplish this, the coupling member can be made of the same material as the tubing, but with a greater thickness so that the stress (and strain) will be less than that of the tubing. Then, when the radial pressure is applied, the unit stress will be greater in the tubing than in the coupling member and the sum total circumferential force will enable a permanent strain to be imposed upon the tubing without also providing a permanent strain in the coupling member. Another way of achieving the same result is to choose a more elastic material for the coupling so that if the unit stress is the same in both the tubing and coupling, the permanent strain will be less in the coupling than in the tubing.

It is of course necessary that the coupling member not have such a sufficiently large cross section that the unit stress imposed therein is so low that it expands such a small degree that it will not return to gripping engagement with the tubing when the joint-forming force is relieved. For example, if the coupling member were of such a mass that it could be essentially considered as rigid, i.e., no expansion or compression at all under the joint-forming pressure, the tubing would expand (or compress) as the joint is made and would then spring back away from the coupling member after the joint-forming pressure was relieved so that the joint would be loose.

It is also apparent, in the light of the above, that the coupling must not be backed up as the joint is made, so that it is free to expand (or compress). If it is backed up, there must be sufficient initial clearance so that it will allow for the desired amount of circumferential strain as the joint is made.

Another important feature of the present invention lies in the manner in which the tubing is deformed into the coupling member grooves. In particular, the radius of curvature at 54 of the deformed portions 52 of the tubing into groove 27 is greater than the radius of curvature at 55 of the deformed portions 51 of the tubing into groove 26. This will thus impose less localized stress on the relatively non-ductile tubing at 54 than at 55 and will greatly reduce the possibility of tubing failure at 54 when the joint is made.

Additionally, the difference in curvature will aid in the axial strength of the joint. The joint is designed so that when the tubing is subjected to tension, as would cause it to pull loose from the coupling member, the load will then be taken substantially at 54. As the tension is increased, the tubing will stretch slightly so that the tubing deformation at 54 cams slightly up the groove edge so that the load is then also taken or shared by the engagement of the tubing deformation 51 with the coupling member groove at 55. Since the radius of curvature at 55 is sharper, the tubing will be anchored to the coupling member to resist further movement of the tubing from the coupling member as the tubing is subjected to tension.

The same feature is present in the FIG. 3 joint, in that the radius of curvature of the tubing at 56 is greater than at 57 to accomplish the same result. Additionally, the joint of FIG. 3 is designed to resist tension when applied to either end of the tubing extending therefrom, and the radius of curvature at 58 is greater than that at 59.

FIGS. 7, 8 and 9 illustrate different ways in which the radius of curvature of the tubing into the groove adjacent the end of the coupling member can be made on a greater radius than that of the tubing into the next adjacent groove.

In FIG. 7, the rib 49 of the die 46 is shaped so that it forces the tubing into contact with the bottom of the groove 27 of the coupling member 10, but does not deform the tubing into full contact with the edge 60 of the groove 37. Thus, the radius of curvature of the tubing 13 at 54 is greater than at 55.

In FIG. 8, the end groove 61 of the coupling member 10' is shallower in depth than the next adjacent groove 62. This could be utilized in forming either the internal grooves of FIG. 3 or the external grooves of FIG. 4. In FIG. 9, the grooves 63 and 64 of coupling member 10" are of the same depth, but the slope of the end groove wall 66 is greater than the slope of the corresponding wall 67 of the next adjacent groove. Again, this construction can be applied to either the internal or the external groove constructions of FIGS. 3 and 4.

Still another important aspect of the present invention is in the provision of the longitudinal ribs 22 and 29 which provide the joints with excellent torsional resistance since the permanent deformations of the tubing will bear against these ribs if torque is applied to the tubing. The provision of at least two ribs in each groove will again cause the torsional load to be shared by the coupling member ribs.

The provision of the longitudinal ribs 29 on the coupling member of FIGS. 4 and 6 has another distinct advantage in that they allow the use of a simple two-piece die 46 and 47 in the formation of the joint. For example, if the grooves 26 and 27 extended completely around the coupling member, it would be necessary for the die ribs 48 and 49 to extend for 180° around the inner face of the dies in order to deform the tubing 13 completely into the coupling member grooves. This would mean that the ends of the die ribs adjacent the die faces 68 and 69 would shear into the tubing tangentially thereto and would cause tubing failure. Such shearing could be avoided by the use of three or more die members, but the actuating mechanism therefor would be considerably more complex and expensive than for a two-piece die. However, in the present invention, the ends 71 and 72 of the die ribs are spaced from the die faces 68 and 69 and are shaped complementary to the sloping faces 73 and 74 of the coupling member grooves so that shearing action into the tubing is minimized.

Thus, the longitudinal ribs 29 on the coupling member 12 serve a double function of providing torsional resistance in the finished joint and of allowing a two-piece die to be used in making the joint.

It is to be realized that the joints illustrated and described herein are preferred embodiments of the invention and that various changes may be made in the shape, size and arrangement of parts without departing from the spirit of the invention or the scope of the attached claims.

Having thus described our invention, we claim:

1. The method of making a joint between an annular coupling member and a cold-worked, thin-walled aluminum alloy tubing having a ductility such that a 2-inch test gauge section of said tubing will have less than 15% total elongation before failure, said method comrising:

forming said annular coupling member of a material and cross section relative to the material and cross section of said tubing member that the same degree of circumferential stress applied to said members will produce a lesser strain in said coupling member than in said tubing member, forming at least two axially spaced circumferential grooves in said coupling member of a depth not greater than one and one-half times the tubing wall thickness, assembling said members in telescopic relation with the tubing member adjacent said grooves and with the tubing member extending axially from one end of said coupling member, applying a force in all radial directions to said assembled members of a magnitude sufficiently great as to produce a circumferential strain in both of said members, permanently deforming the tubing member into said coupling member grooves with the longitudinal curvature of the deformation of the tubing member into the groove adjacent said end of said coupling member being greater than the longitudinal curvature of the deformation of the tubing member into the next groove, and relieving said radial force.

2. A method as set forth in claim 1 wherein said tubing member is inserted into the coupling member and wherein the radial force is applied outwardly from inside the tubing member to expand the tubing and coupling members.

3. A method as set forth in claim 1 wherein said coupling member is inserted into the tubing member and wherein the radial force is applied inwardly from outside the tubing member to compress the tubing and coupling members.

4. A method as set forth in claim 1 and further including forming at least two longitudinal ribs in each of said circumferential grooves in said coupling member.

References Cited

UNITED STATES PATENTS

| 1,442,629 | 1/1923 | Parker. |
| 1,823,158 | 9/1931 | Mogford et al. |
| 2,443,249 | 6/1948 | Jackson _____ 29—517 X |
| 2,737,996 | 3/1956 | Toth. |
| 2,754,577 | 7/1956 | Maxwell _____ 29—523 |
| 3,149,513 | 9/1964 | Dollens _____ 29—516 |
| 3,188,733 | 6/1965 | Rickard _____ 29—523 |

FOREIGN PATENTS

| 371,226 | 4/1932 | Great Britain. |
| 689,043 | 3/1953 | Great Britain. |

CHARLIE T. MOON, *Primary Examiner.*

U.S. Cl. X.R.

29—523, 521; 285—382.4; 287—104